United States Patent
Navar et al.

(10) Patent No.: US 8,239,446 B2
(45) Date of Patent: Aug. 7, 2012

(54) CONTENT DISTRIBUTION ARCHITECTURE

(75) Inventors: Murgesh Navar, San Jose, CA (US);
Andrey Yruski, Pacifica, CA (US);
Roman Markovetski, Pacifica, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1667 days.

(21) Appl. No.: 10/717,176

(22) Filed: Nov. 19, 2003

(65) Prior Publication Data
US 2004/0148344 A1    Jul. 29, 2004

(51) Int. Cl.
*G06F 15/16* (2006.01)
(52) U.S. Cl. ......... 709/203; 709/217; 709/218; 709/219
(58) Field of Classification Search .................. 709/203, 709/217–219
See application file for complete search history.

(56) References Cited

U.S. PATENT DOCUMENTS

| | | | | |
|---|---|---|---|---|
| 5,132,992 A | | 7/1992 | Yurt et al. | |
| 5,241,682 A | * | 8/1993 | Bryant et al. | 709/249 |
| 5,253,275 A | | 10/1993 | Yurt et al. | |
| 5,341,477 A | * | 8/1994 | Pitkin et al. | 709/226 |
| 5,436,653 A | | 7/1995 | Ellis et al. | |
| 5,511,186 A | | 4/1996 | Carhart et al. | |
| 5,524,051 A | | 6/1996 | Ryan | |
| 5,541,638 A | | 7/1996 | Story | |
| 5,550,863 A | | 8/1996 | Yurt et al. | |
| 5,572,442 A | | 11/1996 | Schulhof et al. | |
| 5,586,261 A | * | 12/1996 | Brooks et al. | 709/238 |
| 5,590,195 A | | 12/1996 | Ryan | |
| 5,721,827 A | | 2/1998 | Logan et al. | |
| 5,751,806 A | | 5/1998 | Ryan | |
| 5,809,472 A | | 9/1998 | Morrison | |
| 5,815,671 A | | 9/1998 | Morrison | |
| 5,892,536 A | | 4/1999 | Logan et al. | |
| 5,914,941 A | | 6/1999 | Janky | |
| 5,924,068 A | | 7/1999 | Richard et al. | |
| 5,956,629 A | | 9/1999 | Morrison | |
| 5,986,692 A | | 11/1999 | Logan et al. | |
| 5,987,525 A | | 11/1999 | Roberts et al. | |
| 6,002,720 A | | 12/1999 | Yurt et al. | |
| 6,067,278 A | | 5/2000 | Owens et al. | |
| 6,088,455 A | | 7/2000 | Logan et al. | |
| 6,088,721 A | * | 7/2000 | Lin et al. | 709/214 |

(Continued)

OTHER PUBLICATIONS

Pinho et al.; GloVE: A Distributed Environment for Low Cost Scalable VoD Systems; Oct. 28-30, 2002; IEEE; Proceedings of the 14th Symposium on Computer Architecture and High Performance Computing.*

(Continued)

*Primary Examiner* — Brian P Whipple
(74) *Attorney, Agent, or Firm* — Carr & Ferrell LLP

(57) ABSTRACT

A hierarchical cached media distribution system that employs the Internet. The distribution system assures reliability and quality of service in delivery of timely content. New content is harvested from multiple disparate sources, associated with channels, and encrypted, conditioned, and packaged prior to distribution. A peer-to-peer network scheme is provided where peer groups are associated and maintained for efficient file distribution. Content servers are dynamically prioritized based on availability and cost. A push-based distribution method may be used to exploit cached content stored on peers subject to network address translation (NAT). The distribution system exploits a redundant self repairing packaged file format for media content. Embodiments of the present invention further provide dynamic feedback to content sources.

23 Claims, 7 Drawing Sheets

U.S. PATENT DOCUMENTS

| | | | |
|---|---|---|---|
| 6,144,702 A | 11/2000 | Yurt et al. | |
| 6,154,773 A | 11/2000 | Roberts et al. | |
| 6,161,132 A | 12/2000 | Roberts et al. | |
| 6,173,322 B1* | 1/2001 | Hu | 709/224 |
| 6,178,160 B1* | 1/2001 | Bolton et al. | 370/255 |
| 6,185,532 B1 | 2/2001 | Lemaire et al. | |
| 6,192,340 B1 | 2/2001 | Abecassis | |
| 6,199,076 B1 | 3/2001 | Logan et al. | |
| 6,230,192 B1 | 5/2001 | Roberts et al. | |
| 6,230,207 B1 | 5/2001 | Roberts et al. | |
| 6,233,633 B1 | 5/2001 | Douma | |
| 6,240,459 B1 | 5/2001 | Roberts et al. | |
| 6,246,672 B1 | 6/2001 | Lumelsky | |
| 6,253,237 B1 | 6/2001 | Story et al. | |
| 6,300,880 B1 | 10/2001 | Sitnik | |
| 6,330,593 B1 | 12/2001 | Roberts et al. | |
| 6,393,430 B1 | 5/2002 | Van Ryzin | |
| 6,407,750 B1 | 6/2002 | Gioscia et al. | |
| 6,421,717 B1 | 7/2002 | Kloba et al. | |
| 6,446,080 B1 | 9/2002 | Van Ryzin et al. | |
| 6,449,226 B1 | 9/2002 | Kumagai | |
| 6,453,252 B1 | 9/2002 | Laroche | |
| 6,460,076 B1 | 10/2002 | Srinivasan | |
| 6,987,813 B1* | 1/2006 | Demetrescu et al. | 375/295 |
| 7,100,047 B2* | 8/2006 | Stamos et al. | 713/165 |
| 7,320,131 B1* | 1/2008 | O'Toole, Jr. | 718/104 |
| 7,574,488 B2* | 8/2009 | Matsubara | 709/219 |
| 2002/0046232 A1* | 4/2002 | Adams et al. | 709/200 |
| 2002/0116471 A1* | 8/2002 | Shteyn | 709/217 |
| 2002/0116479 A1* | 8/2002 | Ishida et al. | 709/220 |
| 2002/0198929 A1* | 12/2002 | Jones et al. | 709/201 |
| 2002/0198930 A1* | 12/2002 | Jones et al. | 709/201 |
| 2003/0014759 A1* | 1/2003 | Van Stam | 725/97 |
| 2003/0037150 A1* | 2/2003 | Nakagawa | 709/229 |
| 2003/0152034 A1* | 8/2003 | Zhang et al. | 370/252 |
| 2003/0208621 A1* | 11/2003 | Bowman | 709/242 |
| 2003/0237097 A1* | 12/2003 | Marshall et al. | 725/105 |
| 2004/0003039 A1* | 1/2004 | Humphrey et al. | 709/204 |
| 2004/0034691 A1* | 2/2004 | Tanimoto | 709/206 |
| 2004/0139228 A1* | 7/2004 | Takeda et al. | 709/245 |
| 2004/0172476 A1* | 9/2004 | Chapweske | 709/231 |
| 2005/0021398 A1* | 1/2005 | McCleskey et al. | 705/14 |
| 2005/0066219 A1* | 3/2005 | Hoffman et al. | 714/4 |
| 2005/0198296 A1* | 9/2005 | Teodosiu et al. | 709/225 |
| 2005/0198388 A1* | 9/2005 | Teodosiu et al. | 709/245 |

OTHER PUBLICATIONS

Shareaza; May 27, 2003.*

Tran et al.; ZIGZAG: An Efficient Peer-to-Peer Scheme for Media Streaming; Mar. 30-Apr. 3, 2003.*

Leuf, Bo, "Peer to Peer Collaboration and Sharing Over the Internet", Pearson Education, Inc., Boston, Massachusetts, pp. 3-73 and 213-288.

* cited by examiner

CONTENT DISTRIBUTION ARCHITECTURE

STATEMENT OF RELATED APPLICATIONS

The present application is related to U.S. patent application Ser. No. 10/717,183 filed Nov. 19, 2003 and entitled "Personalized Episodic Download Media Service," the disclosure of which is incorporated by reference.

BACKGROUND OF THE INVENTION

The present invention relates to distribution and more particularly, in one embodiment, to a content distribution architecture.

Increasingly, consumers are relying on the Internet to obtain audio and video content. Users are downloading songs, listening to Internet radio services, and watching video services from Internet sources. The co-filed application entitled "Personalized Episodic Download Media Service" (not admitted prior art) discloses schemes for providing personalized radio services and other media services over the Internet. Also, it is envisioned that television and movie watching will be replaced by video-on-demand services over the Internet.

Audio and video materials require a relatively large amount of data to support a given duration of listening or viewing. The traditional approach to distributing this data to users is storing it on a server. Client computers then retrieve the content from the server as desired using Internet protocols. Unfortunately, providing high speed access to a large volume of data on a server carries a cost. This cost increases with the number of users to be accommodated and the amount of data they retrieve.

To address problems with the scalability of this client-server model, so-called peer-to-peer networks have been developed for content distribution. In a peer-to-peer network, users obtain content from the computers of other users rather than from a central server. Peer-to-peer networks thus exploit otherwise fallow storage and processing resources and are capable of distributing media content at far lower cost.

Current peer-to-peer networks, however, suffer from several serious shortcomings. Content delivery on these networks is "best effort" without any guarantee of delivery of desired content or even the availability of any particular content. Also, these networks have been developed in the context of applications where most network peers are passive at any one time and there is a relatively small number of requesting peers compared to the overall total. These peer-to-peer architectures cannot accommodate emerging applications that require guaranteed delivery of a very large amount of content in a limited time interval regardless of how many peers have the content and whether these peers are available.

Also, previous peer-to-peer networks do not properly authenticate peers or the content that they store. The user has no guarantee that the delivered content is in fact what was requested. Misrepresented or corrupted content may easily be placed into the network either deliberately or unintentionally.

Content users are also confronted with difficulties in finding desired content. There is no centralized catalog. The user typically can only search for desired content by name with no guarantee of a successful search. Rights management is yet another area of concern. Previous peer-to-peer content distribution networks have relied on user-provided content without any verification of rights to that content or protection against further unauthorized copying. Yet to obtain the cooperation of content providers and rights holders in making content available, such protection is necessary.

The above-mentioned co-filed application presents an application for which current content distribution methods are unsuited. A very large amount of media content is to be distributed to client computers to support a paid personalized radio service. Users of a paid service will not tolerate loss of service due to corrupted content, unavailable content, late delivery of time sensitive content, etc. Rights owners will not provide their content to such a service unless further distribution can be restricted.

What are needed are systems and methods for content distribution that address these concerns.

SUMMARY OF THE INVENTION

Embodiments of the present invention provide a hierarchical cached media distribution system that employs the Internet. The distribution system assures reliability and quality of service in delivery of timely content. New content is harvested from multiple disparate sources, associated with channels, and encrypted, conditioned, and packaged prior to distribution. A peer-to-peer network scheme is provided where peer groups are associated and maintained for efficient file distribution. Content servers are dynamically prioritized based on availability and cost. A push-based distribution method may be used to exploit cached content stored on peers subject to network address translation (NAT). The distribution system exploits a redundant self repairing packaged file format for media content. Embodiments of the present invention further provide dynamic feedback to content sources.

A first aspect of the present invention provides a method for operating a client to retrieve desired content. The method includes: checking availability of the desired content from other clients on a peer-to-peer network, if the content is available from at least one of the other clients, retrieving the content from at least one of the other clients via the peer-to-peer network, and, if the content is not available on at least one of the other clients, retrieving the content from a content server of the peer-to-peer network.

A second aspect of the present invention provides a method for operating a peer-to-peer network. The method includes: sending a list of peers from a content broker to a first peer in a peer-to-peer network and employing a push method to send content from the first peer to a second peer belonging to the list of peers.

A third aspect of the present invention provides a method for operating a content distribution network. The method includes: assigning a plurality of clients to a plurality of peer-to-peer networks, sending each of the plurality of clients list information to identify network peers of the peers, the list information identifying at least one dedicated content server and at least one client peer, and distributing content via the plurality of peer-to-peer networks.

A fourth aspect of the present invention provides a method for operating a publisher server to distribute content. The method includes: preparing the content for distribution, transferring the content to a content server, and transferring information identifying the content to a catalog server. Clients retrieve the content either directly or indirectly from the content server after retrieving the identifying information from the catalog server.

Further understanding of the nature and advantages of the inventions herein may be realized by reference to the remaining portions of the specification and the attached drawings.

DESCRIPTION OF SPECIFIC EMBODIMENTS

Introduction

The present invention will be described with reference to an example media content distribution architecture. An application of this example media content distribution architecture is to support the personalized media service described in the co-filed application entitled "Personalized Episodic Download Media Service." A media content distribution architecture according to the present invention is, however, not restricted to personalized media service described therein.

To accommodate a personalized media service, the presently described distribution architecture is able to deliver a large volume of content to many users with quality of service and guaranteed delivery time and at low cost. Content delivery may be prioritized based on content type and the identity of the user. The integrity of the content is guaranteed. Content distribution occurs in the context of a digital rights management scheme where further distribution is controlled. Content can be obtained from multiple disparate providers. Furthermore, feedback about the content can be readily aggregated and reported to the content source.

Systems

As has already mentioned user interfaces of the present invention exploit a variety of systems and devices. Preferably, an appropriately configured personal computer, referred to herein as a "station," is used for radio personalization, management and organization of content, retrieval of content via a network, rights management, recording, etc. Playing of content may be done via either the station or a portable device such as MP3 player, PDA, smartphone, car audio system, etc. The station or portable device preferably also allows for convenient listener rating of audio materials to facilitate publisher collection of ratings, easy user access to information about currently playing content, easy purchase of currently playing content, etc.

Figure 1:
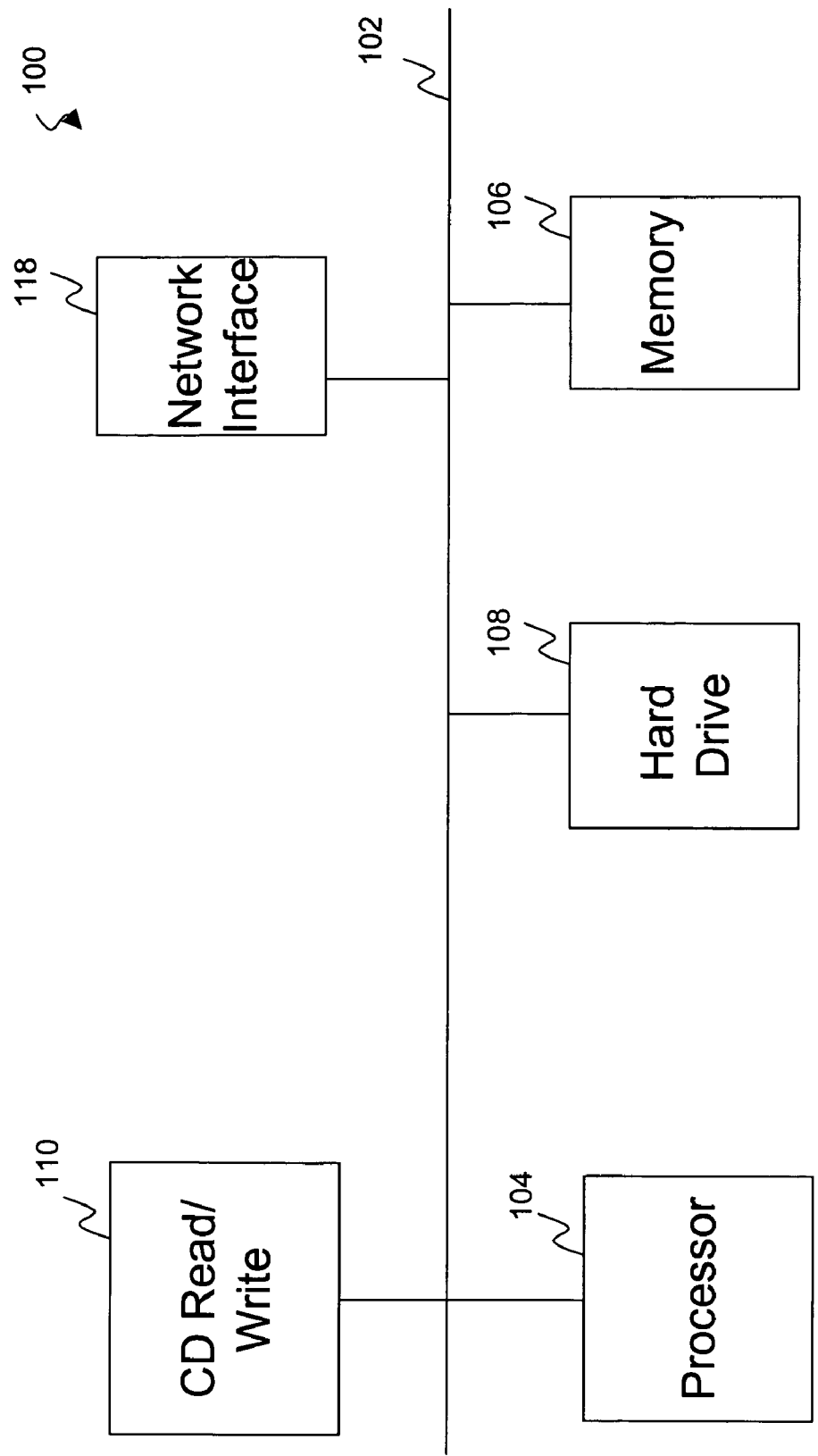
FIG. 1 depicts a computer system useful in implementing embodiments of the present invention.

FIG. 1 depicts elements of a representative computer 100 that can implement any of the various nodes of the distribution architecture described herein. For example, representative computer 100 may be, e.g., a client station, a content server, etc. Computer 100 may be a laptop computer, desktop computer, rack-mounted server, etc. The various elements are depicted as being interconnected by a bus 102. However, it will be understood that the actual interconnections among the various elements of a modern computer are more complex. Further bus details are not presented because they are not germane to the operation of the present invention. Also, it will be appreciated that various elements may be either inside the computer's chassis, outside the computer's chassis, or implemented by elements both inside and outside the chassis.

The elements of computer 100 will now be described. These elements are merely representative. Furthermore, not all elements will be required in every type of node. Computer 100 incorporates basic elements such as a processor 104, a memory 106, a hard drive 108, and a CD read/write player 110. Processor 104 typically executes instructions stored in memory 106. The instructions perform functions provided by the present invention. Longer term storage of instructions may be on hard drive 108, on a CD-ROM accessed through player 110, on other media such as a DVD-ROM, etc. Another example of a computer-readable medium that carries the instructions may be a signal received over a network, e.g., downloading of software.

Another key role of the various memory and storage devices is to store content to be distributed and/or played. For example, audio content may be cached on hard drive 108 and loaded into memory 106 while being played. Audio content stored on hard drive 108 may be cached for distribution to other nodes or to a portable device.

To interact with other nodes, computer 100 incorporates a network interface 118. Network interface 118 may itself incorporate one or more of, e.g., an Ethernet interface, DSL modem, cable modem, fiber optic transceiver, wireless modem, etc. Content may also be retrieved from a CD inserted in player 110 or from other media inserted in an appropriate peripheral device.

Data Structures

From the viewpoint of the user, a basic unit of media content organization is referred to as a "channel." A channel specifies media content that can be selected by a user for immediate play. By specifying a channel, one does not necessarily specify an order of play. Some channels are specified by a remote publisher and are pre-defined from the perspective of the user. Other pre-defined channels correspond to e.g., user-owned media content derived from CDs, DVDs, etc., locally or remotely recorded content from Internet, over-the-air, cable, satellite, etc., text from the web or other source that has been converted to audio, etc. Custom channels may be created by a user by way of combining pre-defined channels or components thereof.

Some publisher-defined channels correspond to music genres and sub-genres. Other pre-programmed channels may include radio shows, news materials, etc. Other types of channels consist of content that the user has separately acquired rights to. For example, a channel may be the contents of a CD that the user has copied onto the station's hard drive. A channel may be a playlist that the user has constructed from multiple CDs. Other channel types are described in "Personalized Episodic Download Media Service."

Although there are many types of channels that are available from the user perspective, the distribution architecture description will generally focus on channels for which content is delivered to the client station and is associated with that channel within the distribution network as a whole and not just within the client station. To support user-defined channels, the distribution architecture will deliver the content of the constituent pre-defined channels.

Content injected into the distribution network may be associated with one or more programs. Each program may be associated with one or more channels. Each channel may in turn be incorporated into one or more other channels.

A channel may incorporate other channels as well as "programs." A program consists of one or more of what are referred to herein as "assets." Assets are particular items of audio material (or, e.g., video material in an alternative embodiment). An asset may be e.g., a song, a short news item, etc.

For the purposes of distribution, each asset itself consists of one or more "files." A file may contain e.g., one song (3-5 minutes), a short program (15-20 minutes), or a two hour radio show, etc. There are no upper or lower constraints on the size of a file. In many user interface implementations, the file represents a unit of content that can be selected to be skipped by the user.

Figure 7:
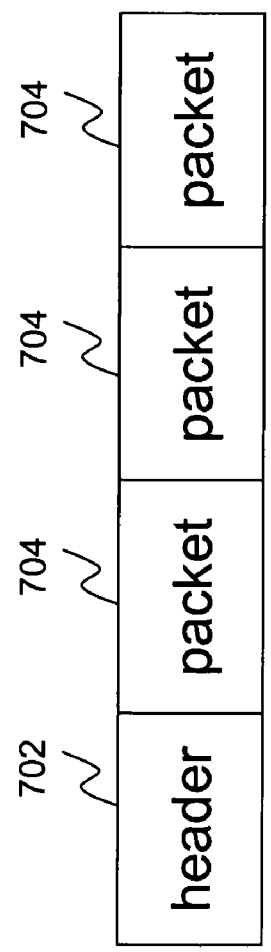
FIG. 7 depicts a file structure used in storing and transmitting content according to one embodiment of the present invention.
Figure 7:
Figure 7:
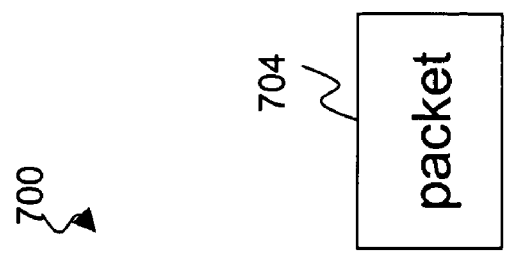

FIG. 7 depicts structure of a representative file 700 according to one embodiment of the present invention. File 700 can be stored within the Windows file structure as, e.g., an .SRND file. File 700 includes a header 702 followed by a series of "packets" 704. The header 702 includes checksum and length information for each of the packets, metadata about the content of the file including titles, etc. In one implementation, the checksum information is in the form of a cyclic redundancy check (CRC) or similar for each packet. The header also specifies a license server from which to obtain a license for the packaged content.

The packets include the media content information appropriately encoded and preferably encrypted. In one implementation, each packet is approximately 128 kilobytes long, although this value can be varied when content is harvested and published as explained below. It will be appreciated that these are preferably application layer packets and not TCP/IP or other network layer or transport layer packets. Each packet is identified by the unique name of the file to which it belongs and a packet number indicating position in the file. Each packet has a header that contains the actual packet size and the packet CRC. Packets 704 can flow through the distribution network independently with the receiving client using the file header information to reassemble and verify the file.

Decrypted file contents are, however, preferably accessible to the user only by playing them through an application such as the one described in "Personalized Episodic Download Media Service." The user is also preferably restricted from transferring content other than through the distribution architecture described herein.

Content Distribution Network Participants

Figure 2:
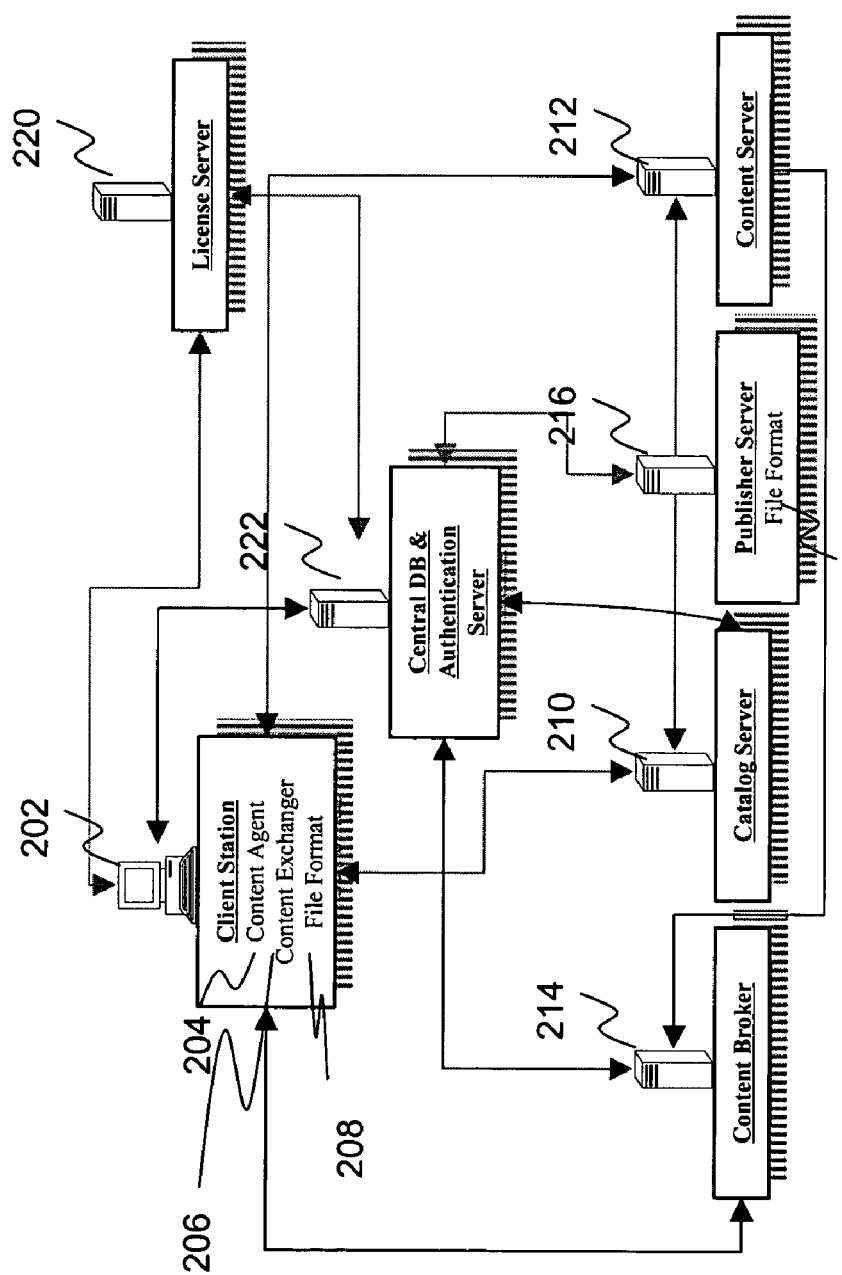
FIG. 2 depicts elements of a media content distribution architecture according to one embodiment of the present invention.

FIG. 2 depicts elements of a media content distribution architecture 200 according to one embodiment of the present invention. The various depicted nodes can be implemented by computers such as computer 100. Interconnections between the nodes of architecture 200 are preferably over the Internet. A representative client station 202 is operated by the user and is typically capable of playing content and/or staging the content for further distribution to a portable device or other computers under the control of the user. Client station 202 is also capable of forwarding content to other client stations as a part of peer-to-peer networking according to the present invention. For the purposes of participation in distribution architecture 200, client station 202 includes three software entities: a content agent 204, a content exchanger 206, and a file format module 208.

File format module 208 assembles received packets into files, decodes and decrypts packet contents, and requests repeat deliveries of corrupted packets, thus providing redundant information transmission.

File format module 208 thus repairs corrupted packets both for local play and further distribution. Content exchanger 206 manages the exchange of files with content sources. Content agent 204 controls content exchanger 206 using catalog information retrieved from a catalog server 210.

Catalog server 210 is a catalog/indexing server. Catalog server 210 holds correlations among channel identifiers, program identifiers, asset identifiers, and files names. By reference to catalog server 210, one can determine, e.g., 1) the programs and channels included within a given channel, 2) the assets included within a program, and 3) the files that include the content for a given asset.

A content server 212 stores content in the form of files and their constituent packets. Content server 212 is typically a dedicated server. A content broker 214 stores information about available download sources. Such download sources include one or more instantiations of content server 212 and client station 202.

A publisher server 216 harvests, encrypts, and packages content. Publisher server 216 harvests content from content providers in accordance with operative business rules. Publisher server 216 also encodes the content appropriately, encrypts the content, delivers the content to one or more content servers 212, and delivers indexing information about the content to catalog server 210. Publisher server 216 incorporates a file format module 218 to appropriately encode and encrypt the content and format the content in accordance with the file structure of FIG. 7.

A license server 220 generates and distributes content certificates used in authenticating and decrypting content. A central database and authentication server 222 stores information about users and allows other nodes to authenticate users.

Figure 3:
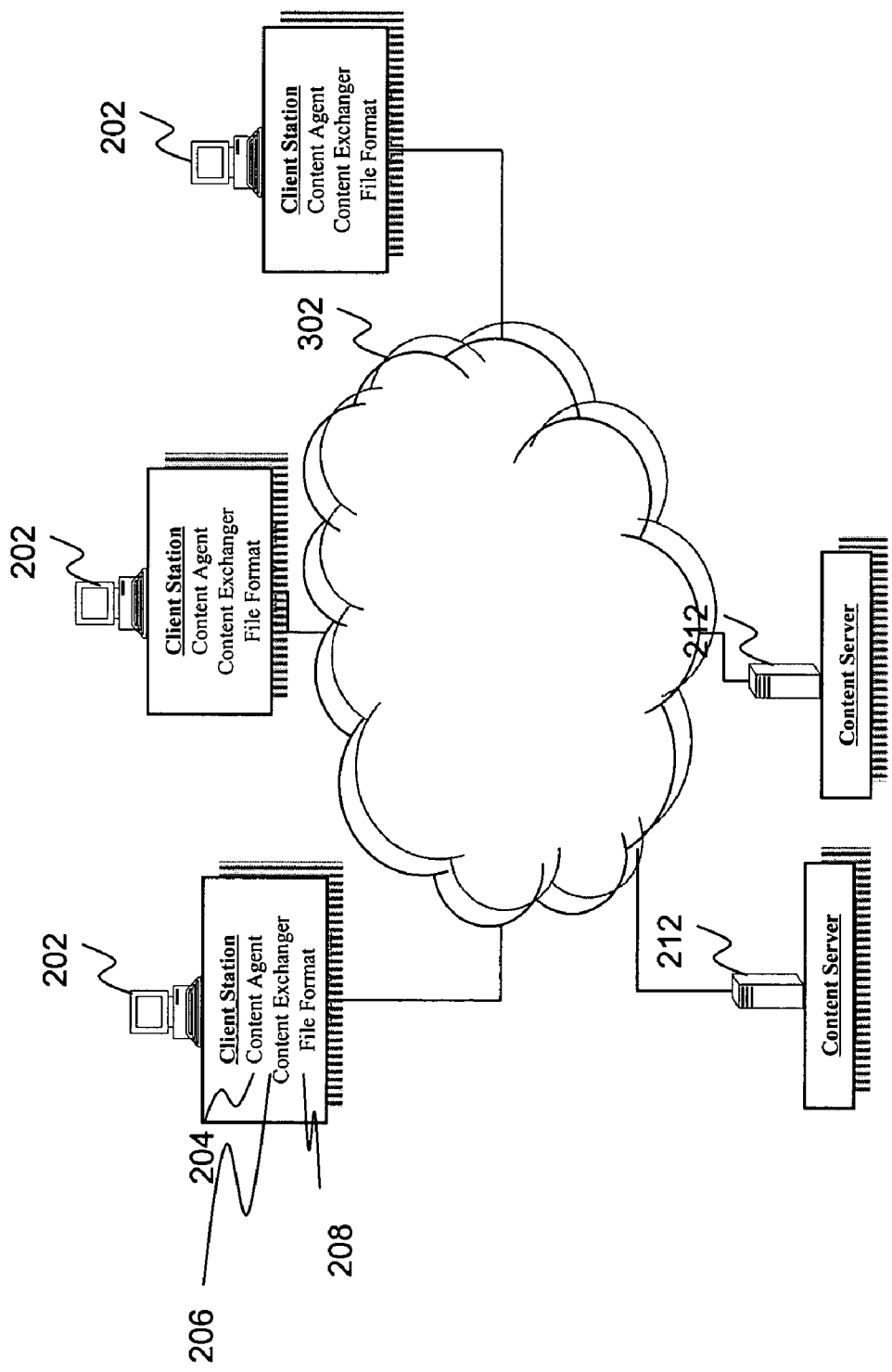
FIG. 3 depicts further elements of the media content distribution architecture of FIG. 2.

FIG. 3 depicts another view of distribution architecture 200. The view of FIG. 3 shows that there are multiple client stations 202 and multiple content servers 212. They are interconnected by the Internet 302. Distribution architecture 200 includes one or more peer-to-peer networks. Each peer-to-peer network includes at least one, but possibly more, content servers 212 and multiple client stations 202. A variety of content distribution methods can be used between content servers 212 and client stations 202 as will be explained.

Each file entry in catalog server 210 has an associated argument that identifies the IP address of a content broker 214. Another file entry argument specifies whether the file is to be directly downloaded from one or more of content servers 212 or if downloading should first be attempted through a peer-to-peer network structure.

Content broker 214 divides clients and content servers into peer-to-peer networks based on, e.g., interest profiles of clients, geographical considerations, content type, content source, etc. For each peer-to-peer network, content broker 214 maintains a list or lists of content sources associated with files. The content source lists specify one or more content servers 212 that store the file as well as one or more client stations 202 available for file download. It will be understood that content servers, even on the same list, may be maintained by different entities. There can be many content servers that each host a different subset of available content. Content servers may be selected for the list based on availability of specific content. The composition of the content source list will change over time. Also, client station peers will attach and detach as computers are turned on and off, etc.

Embodiments of the present invention provide conditional content server selection. Each content server sends the content broker information to the broker about its bandwidth capabilities, bandwidth cost versus time of day, and a list of availability windows. The content broker can then optimize bandwidth availability and costs by changing the composition of the content source list and the relative priority level of content servers. For example, a particular server in Hong Kong might be operational from 24:00 to 06:00 at a cost of $1 per 100 Mb/sec/hour, from 18:00 to 20:00 with a cost of $1.50 per 100 Mb/sec/hour, and the rest of the day with a cost of $8-$10 per 100 Mb/sec/hour. The Hong Kong-based content server sends this information to the content broker upon connecting to it. The content broker thus learns about this content server's availability and further knows that for optimal cost, it should only include this content server in the content source list between 24:00 and 06:00 and between 18:00 and 20:00. Generally speaking content broker 214 will prioritize lower cost bandwidth content servers so that these are used more frequently. Bandwidth availability may also influence priority selection.

Client station peers notify content broker 214 of their availability as they connect to the Internet and at periodic intervals so that inactive peers can be removed from the content source list. The content broker can thus change both the content servers and the peers listed on the content source list over time. As a member of a peer-to-peer network, client station 202 can retrieve content from its peers. Different packets belonging to the same file can be retrieved from different peers.

For each file, however, one or more of content servers 212 remain as a fallback from which to request content when peers do not have the content or are busy or unavailable. This allows content distribution to start with transfer of content from one of content servers 212 to one or more of client stations 202. Also service guarantees are preserved regardless of the peer-to-peer network status. There may be multiple content servers that are accessed in accordance with a priority assigned to them by content broker 214 as described above.

Figure 4:
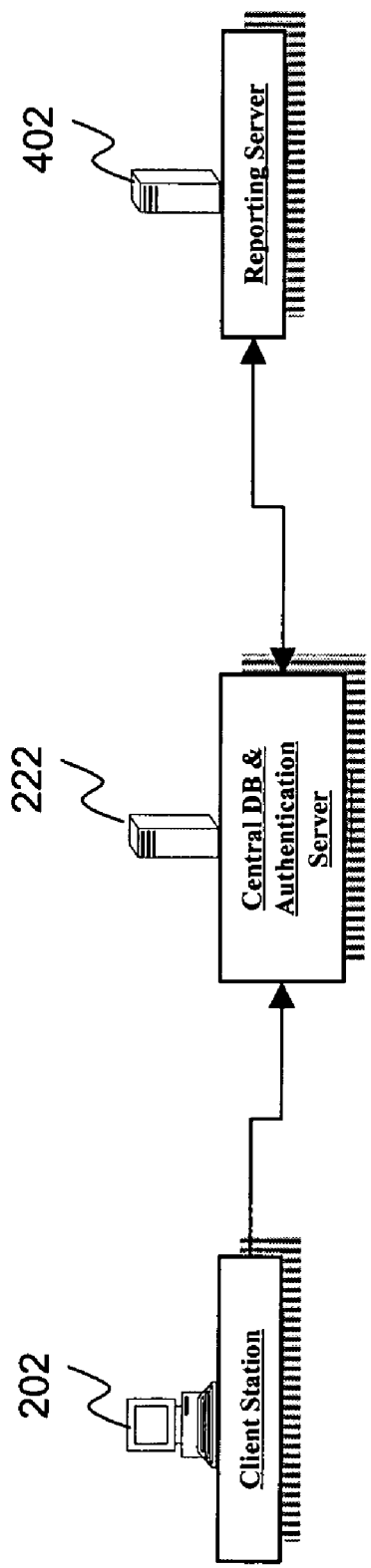
FIG. 4 depicts an architecture for reporting feedback to content providers according to one embodiment of the present invention.

FIG. 4 depicts an architecture for reporting feedback to content providers according to one embodiment of the present invention. Client station 202 collects user feedback about content. Such feedback can include user ratings of content, information about user decisions to skip certain content, etc. The user feedback may have been collected on the client station itself, a portable device operated by the user, or another computer operated by the user. The user feedback is sent to central database and authentication server 222. Central database and authentication server 222 aggregates the submissions from the various client servers and stores aggregate information in a database.

A reporting server 402 generates analysis reports based on the database contents and forwards the reports to content providers or other approved interested parties. User privacy is maintained since preferably only aggregate information about user preferences is reported.

Retrieval of Content by Client Station

Figure 5:
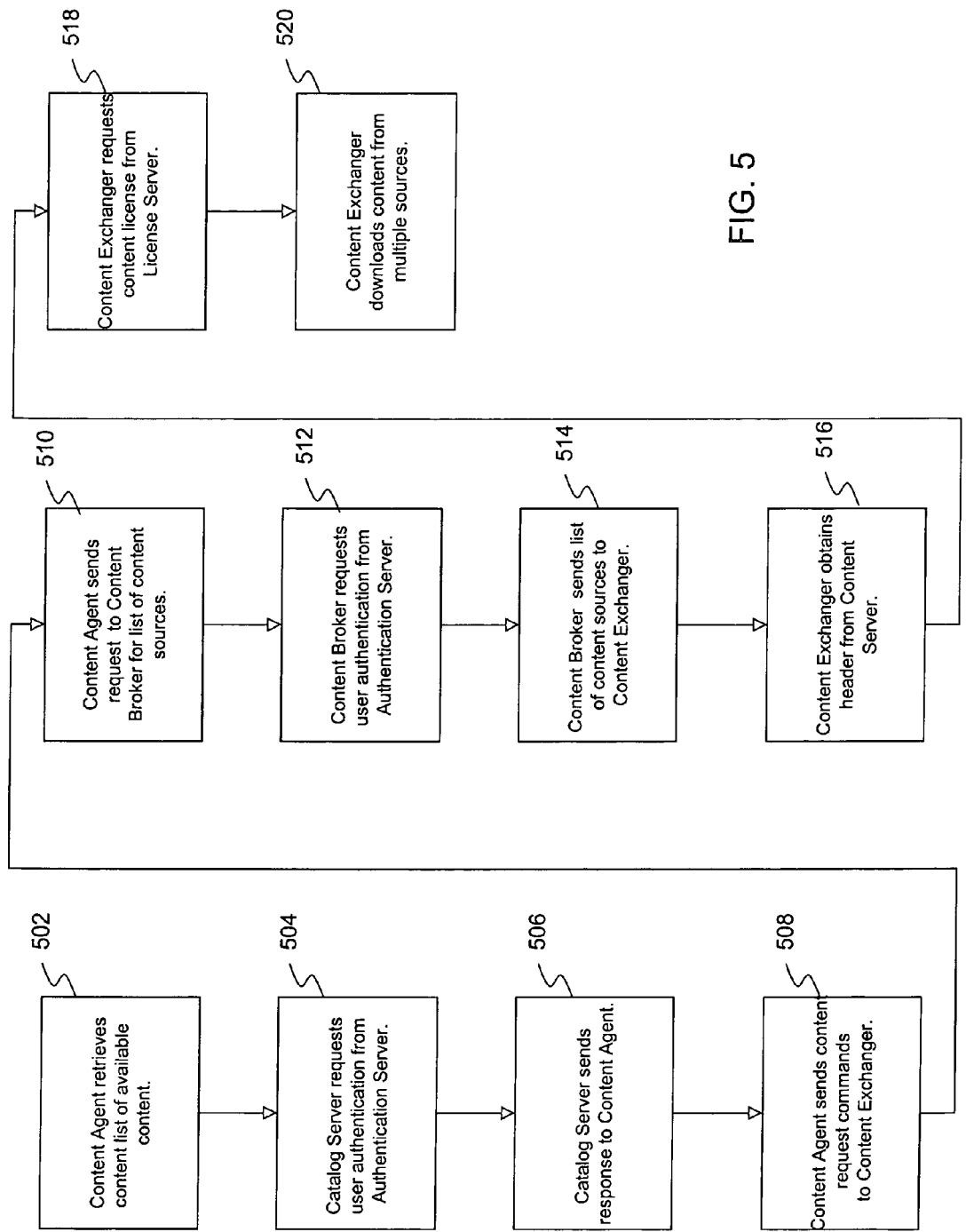
FIG. 5 is a flowchart describing steps of distributing content to a client station according to one embodiment of the present invention.

FIG. 5 is a flowchart describing steps of distributing content to a client station according to one embodiment of the present invention. At step 502, content agent 204 requests a content list from catalog server 210. Content agent 204 specifies desired content as one or more channels, programs, or assets. The content list specifies the files associated with the desired content.

At step 504 catalog server 210 requests authentication of the requesting client station from authentication server 222. Once the user is authenticated, at step 506, catalog server 210 sends the requested content list back to content agent 204.

Content agent 204 then parses the content list or catalog to identify the files for which retrieval will be requested. Content request commands for these files are transferred to content exchanger 206 within client station 202 at step 508. For each file there is a specified content broker identified by the information retrieved from catalog server 210.

Content exchanger 206 sends the content broker 214 a request for a list of content sources at step 510. The requested content source list includes one or more content servers 212 as well as the addresses of currently available peers.

At step 512, content broker 214 requests authentication of the requesting client station from authentication server 222. Once such authentication is obtained, content broker 214 sends the content source list to content exchanger 206 at step 514. The content source list will identify peers including content servers in order of priority and other clients.

The remainder of the steps of the FIG. 5 flowchart will be described with reference to a particular requested file. At step 516, content exchanger 206 requests the header 702 of the file from the specified content server 212. The header is preferably always requested from content server 212 rather than one of the network peers. This facilitates authentication of content and protects the distribution architecture from accidental or intentional corruption of content. At step 518, content exchanger 206 requests and obtains a content license from license server 220. The URL of license server 220 is identified in the file header. The request includes a content identifier and key identifier obtained from the file header as well as a client machine identifier, a user name, and a user password. License server 220 services the request by retrieving a seed key from central database and authentication server 222 based on the content identifier, checking user privileges, and generating the appropriate certificate to return to the user.

Content exchanger 206 then downloads the packets 704 of the requested file at step 520. The packets are identified from the previously retrieved header. The packets are downloaded in parallel from multiple peer client stations on the list obtained from content broker 214. The process of obtaining an individual packet from a peer will now be described in detail. In one implementation, HTTP is employed. The requesting client station (requester) begins the download. It is aware of the filename and the packet number of the desired packet. The requester computes a start position (in bytes) of the packet within the file. This start position is based on the packet number and the packet length. The requester then sends a request with the file name and start position to a providing client station or content server (provider).

The provider checks if it has the file. If the provider does not have the file it responds with a "file not found" and the requester sends its request to the next peer on the content source list. If the provider does have the file, it sets its read pointer to the desired position in the file. The requester then starts to read the file from this position. First, the requester reads the packet header to determine whether the packet is non-empty. If the packet size indicator in the header shows that the packet is in fact empty at this provider, the requester disconnects from the provider and moves on to the next peer on the content source list. If client peers are exhausted, the requester moves on, in order of priority, to content servers in its search for the desired content.

If the packet is non-empty, the requester downloads the packet payload. Based on the received payload, the requester computes a packet CRC and compares it to the CRC found in the file's header. The file header was previously obtained directly from the content server. If the CRCs match, the packet content is stored locally by the requester and is now available for download by other peers. If the connection between the requester and provider is interrupted at any point, the provider can resume retrieval at the next unread byte position by connecting to another peer.

Multiple packet retrievals may occur simultaneously. A file may therefore be retrieved quickly with the needed server bandwidth being distributed over multiple peers.

File format module 208 assembles the packets into a file to be stored locally as a .SRND file. File format module 208 verifies integrity of individual packets by checking against a checksum or hash found in the file header. Corrupted packets can then be re-requested from a peer or the content server. If one or more packets cannot be obtained from any peer in a timely fashion, they can be obtained directly from the content server.

What has just been described is a pull mechanism. For a push mechanism, steps 502 through 514 may not occur in the same way. For example, a push operation may begin with the serving peer requesting a client peer list from the content broker. After authenticating the serving peer, the content broker sends the list to the requesting serving peer. Alternatively, the content broker may initiate the push process by sending the peer list without a request. The serving peer then sends one or more of the peers on the list information about content it has.

It does this by sending a message to its peers listing the completed files that it has available for download. Another peer receiving such a message will respond by checking if it lacks packets from the listed files. If it does need the packets, it will respond with the desired filename and the read position. The packet reading process then proceeds as previously described.

If the peer receiving the file list already has the complete set of packets for each of the listed files, it responds with the filename and packet number for some other packet it needs. If the content pushing peer has the requested packet, the retrieval process is initiated. If the content pushing peer does not have the requested packet, the packet is requested from another peer.

In one push application, the network may be configured such that any peer that is not exploiting its available or maximum desired serving bandwidth begins pushing content as described. Another push application is exploiting content cached on peers behind firewalls that employ network address translation (NAT). Peers that are subject to NAT may not be readily accessible to requesting clients. In one implementation, the content broker is aware of which peers are subject to NAT. These peers are 1) omitted from the content source lists used for pull distribution and 2) told to push their content (or a prioritized subset of their content) towards other members of the peer list using the just-described push technique. In this way, the percentage of peers usable for information retrieval is greatly increased.

Where multiple peers connect to the same corporate or home LAN, a modified pull mechanism may be used. Before employing the content broker to learn about more distant peers, a requesting peer may first send discover messages over the LAN to find local peers. Retrieval is first attempted from one or more discovered local peers before resorting to remote peers identified by the content broker.

Publication of Content

Figure 6:
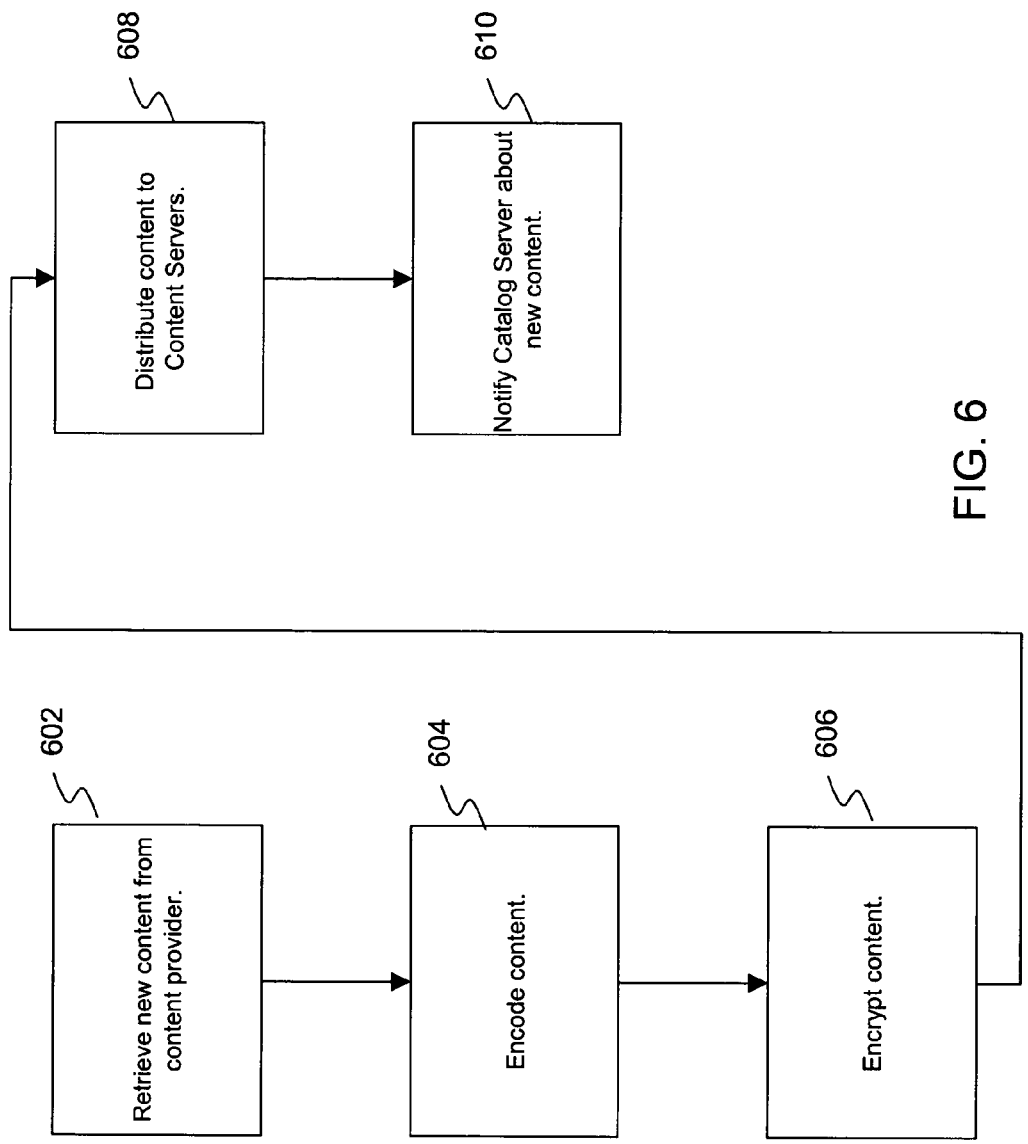
FIG. 6 is a flowchart describing steps of publishing content according to one embodiment of the present invention.

FIG. 6 is a flowchart describing steps of publishing content according to one embodiment of the present invention. At step 602, publisher server 216 retrieves content from a content provider in accordance with provider-specific rules or schedules. The content retrieval may exploit conventional protocols such as File Transfer Protocol (FTP), HTTP, Secure Copy Protocol (SCP). Alternatively, content retrieval may be by way of the content provider's proprietary application.

Retrieved content may be in a variety of audio formats. File format module 218 within publisher server 216 will convert the audio to a standard format for the distribution architecture such as e.g., mp3, wma, mpeg, wmv, etc. at step 604. A part of this encoding may be normalizing the audio volume to a standard maximum level to avoid any user readjustment of volume settings to reflect disparate content sources. File format module 218 forms the content into the file format of FIG. 7. At step 606, publisher server 216 encrypts the packets.

The file header is loaded with packet checksums or hashes and information about the length and ordering of the packets. There is also an overall file hash computed. This hash is compared to previous files so that the same file need not be distributed twice, even if it has been harvested from multiple sources. For example, if the same song is harvested from two different programming sources, only one file is generated and distributed. At step 608, the file is sent to one or more content servers 212. The content servers 212 that receive the file inform the appropriate content broker 214 that they have the file. Also, a decryption seed key is sent to central database and authentication server 222 along with a content identifier.

At step 610, publisher server 216 sends a notification to catalog server 210. The notification identifies the file and links it to an asset, one or more programs, and one or more channels.

The above describes the harvesting of a single asset. Publisher server 216 can also harvest a program by harvesting a list of assets making up the program. Publisher server 216 then creates all of the necessary files. Linkages between the programs and assets are established on catalog server 210 by publisher server 216.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the steps of FIGS. 5-6 may represent concurrent or partially concurrent processes. Also, while the present invention has been primarily described with reference to audio content, video content, for example, is also readily accommodated.

The invention claimed is:

1. A method for retrieving specified content in a peer-to-peer network, the method comprising:
    checking the availability of specified content from content sources including other clients and content servers in the peer-to-peer network, wherein the availability of the specified content is identified in a list including names, the list provided to clients in the peer-to-peer network, and wherein the list including names is periodically updated to reflect a current availability of content from the content sources; and
    retrieving the specified content in parallel from a combination of clients, servers, or clients and servers, wherein the specified content is retrieved from:
        one or more of the other clients in the peer-to-peer network when the specified content is available from one or more of the other clients in the peer-to-peer network as identified by the list including names,
        one or more of the content servers in the peer-to-peer network when the specified content is not identified on the list including names, and
        one or more of the content servers in the peer-to-peer network when a guaranteed delivery time of the specified content is not satisfied by the other clients in the peer-to-peer network.

2. The method of claim 1, wherein retrieving the specified content from the one or more of the other clients includes:
    retrieving a first portion of the specified content from a first other client in the peer-to-peer network; and retrieving a second portion of the specified content from a second other client in the peer-to-peer network, wherein the first and second other clients are both identified on the list including names.

3. The method of claim 2, further comprising:
determining that a retrieved portion of the specified content is corrupted; and
retrieving an uncorrupted portion of the specified content from another content source in the peer-to-peer network, the another content source identified on the list including names.

4. The method of claim 1, wherein a content broker selects the one or more content servers based on a cost associated with each of the content servers.

5. The method of claim 1, wherein a content broker selects the one or more content servers based on the bandwidth availability of each of the content servers.

6. The method of claim 1, wherein the specified content includes audio content.

7. The method of claim 1, wherein the specified content includes video content.

8. The method of claim 1, wherein the specified content includes a static item of content.

9. The method of claim 1, wherein retrieval of the specified content includes retrieval of a header associated with one or more packets corresponding to the specified content, the header including information identifying the one or more packets.

10. The method of claim 9, further comprising repeating retrieval of corrupted packets from the one or more packets corresponding to the specified content.

11. The method of claim 1, further comprising acquiring a license for the specified content.

12. The method of claim 1, further comprising authenticating a requesting user prior to granting access to the list including names.

13. A method for content distribution in a peer-to-peer network, the method comprising:
identifying content sources including a plurality of clients in a peer-to-peer network and a dedicated content server;
identifying content available at each of the plurality of clients in the peer-to-peer network; and
sending each of the plurality of clients information to identify the dedicated content server and content available at client peers, wherein the information is periodically updated to reflect a current availability of content from client peers, whereby specified content is retrieved by a requesting client in parallel from a combination of client peers, the dedicated content server, or client peers and the dedicated content server, the specified content being retrieved from:
one or more of the plurality of clients when the specified content is available from the one or more of the plurality of clients in the peer-to-peer network as identified by the information concerning available content,
the dedicated content server when the specified content is not identified by the information concerning available content, and
the dedicated content server when a guaranteed delivery time of the specified content is not satisfied by the plurality of clients in the peer-to-peer network.

14. The method of claim 13, wherein the information includes a priority ranking of the content sources.

15. The method of claim 14, wherein the priority ranking is based on cost.

16. The method of claim 14, wherein the priority ranking is based on available bandwidth.

17. The method of claim 14, wherein the priority ranking varies over time of day.

18. The method of claim 13, further comprising authenticating each of the plurality of clients prior to providing information concerning the current availability of content from client peers.

19. The method of claim 13, further comprising acquiring a license prior to the specific content being downloaded by the requesting client.

20. A system for peer-to-peer distribution of content, the system comprising:
a content server configured to store content for distribution in a peer-to-peer network;
an authentication server configured to authenticate the presence of individual clients requesting the content in the peer-to-peer network;
a content broker configured to distribute and update information about the presence of authenticated individual clients in the peer-to-peer network, the content broker further configured to distribute and update information about the availability of content at content sources including the content server and authenticated individual clients in the peer-to-peer network, wherein specified content is retrievable in parallel from a combination of authenticated individual clients, the content server, or authenticated individual clients and the content server, the specified content being retrieved from:
one or more of the authenticated individual clients when the specified content is available from the one or more of the authenticated individual clients as identified by the information concerning the availability of content,
the content server when the specified content is not identified by the information concerning the availability of content, and
the content server when a guaranteed delivery time of the specified content is not satisfied by authenticated individual clients in the peer-to-peer network; and
a license server configured to license content for download by an authenticated individual client from another authenticated client in the peer-to-peer network.

21. The system of claim 20, where the content broker further distributes and updates information concerning bandwidth availability, cost, or availability windows of the content server or individual authenticated clients in the peer-to-peer network.

22. A computer-readable non-transitory storage medium having embodied thereon a program, the program being executable by a processor to perform a method for retrieving specified content in a peer-to-peer network, the method comprising:
checking the availability of specified content from content sources including other clients and content servers in the peer-to-peer network, wherein the availability of the specified content is identified in a list including names, the list provided to clients in the peer-to-peer network, and wherein the list including names is periodically updated to reflect a current availability of content from the content sources; and
retrieving the specified content in parallel from a combination of other clients, content servers, or other clients and content servers, wherein the specified content is retrieved from:
one or more of the other clients in the peer-to-peer network when the specified content is available from one or more of the other clients in the peer-to-peer network as identified by the list including names, one or more of the content servers in the peer-to-peer network when the specified content is not identified on the list including names, and one or more of the content servers in the peer-to-peer network when a guaranteed delivery time of the specified content is not satisfied by the other clients in the peer-to-peer network.

23. A computer-readable non-transitory storage medium having embodied thereon a program, the program being executable by a processor to perform a method for content distribution in a peer-to-peer network, the method comprising:

identifying content sources including a plurality of clients in a peer-to-peer network and a dedicated content server;

identifying in a list including names content available at each of the plurality of clients in the peer-to-peer network; and sending each of the plurality of clients information to identify the dedicated content server and content available at client peers, wherein the information is periodically updated to reflect a current availability of content from client peers, whereby specified content is retrieved by a requesting client in parallel from a combination of client peers, the dedicated content server, or client peers and the dedicated content server, the specified content being retrieved from:

one or more of the plurality of clients when the specified content is available from the one or more of the plurality of clients in the peer-to-peer network as identified by the information concerning available content, the dedicated content server when the specified content is not identified by the information concerning available content, and the dedicated content server when a guaranteed delivery time of the specified content is not satisfied by the plurality of clients in the peer-to-peer network.

* * * * *